United States Patent
Huang et al.

(10) Patent No.: US 9,829,990 B2
(45) Date of Patent: Nov. 28, 2017

(54) FLEXIBLE KEYBOARD COVER FILM

(71) Applicant: HannsTouch Solution Inc., Tainan (TW)

(72) Inventors: Hung-Yi Huang, Tainan (TW); Yi-Chen Wu, Tainan (TW)

(73) Assignee: HannsTouch Solution Incorporated, Tainan (TW)

( * ) Notice: Subject to any disclaimer, the term of this patent is extended or adjusted under 35 U.S.C. 154(b) by 0 days.

(21) Appl. No.: 14/720,982

(22) Filed: May 26, 2015

(65) Prior Publication Data

US 2016/0239100 A1    Aug. 18, 2016

(30) Foreign Application Priority Data

Feb. 17, 2015  (CN) .......................... 2015 1 0085483

(51) Int. Cl.
*G06F 3/02* (2006.01)
*G06F 3/0489* (2013.01)

(52) U.S. Cl.
CPC ............. *G06F 3/02* (2013.01); *G06F 3/0489* (2013.01)

(58) Field of Classification Search
CPC ........... G06F 1/1632; G06F 2200/1633; G06F 2200/1634
See application file for complete search history.

(56) References Cited

U.S. PATENT DOCUMENTS

| | | | | |
|---|---|---|---|---|
| 2007/0247429 A1* | 10/2007 | Westerman | ........... | G06F 3/0219 345/168 |
| 2008/0248836 A1* | 10/2008 | Caine | ............... | G06F 1/1616 455/566 |
| 2009/0135144 A1* | 5/2009 | Chuang | ............... | G06F 3/0202 345/168 |
| 2010/0141605 A1* | 6/2010 | Kang | ............... | G06F 1/1626 345/174 |
| 2010/0320069 A1* | 12/2010 | Zhao | ............... | H01H 13/83 200/600 |
| 2011/0242035 A1* | 10/2011 | Nozawa | ............... | G06F 3/041 345/173 |
| 2011/0291936 A1* | 12/2011 | Wu | ............... | G06F 3/04886 345/168 |
| 2012/0092279 A1* | 4/2012 | Martin | ............... | G02B 26/0833 345/173 |
| 2013/0050104 A1* | 2/2013 | Lee | ............... | G06F 3/0418 345/173 |
| 2013/0156482 A1* | 6/2013 | Kaliebe | ............... | G06F 3/0202 400/472 |
| 2014/0320422 A1* | 10/2014 | Williams | ............... | G06F 3/0418 345/173 |
| 2015/0103055 A1* | 4/2015 | Kreiner | ............... | G06F 1/1632 345/178 |

\* cited by examiner

*Primary Examiner* — Nelson Rosario
*Assistant Examiner* — Chun-Nan Lin
(74) *Attorney, Agent, or Firm* — Winston Hsu

(57) ABSTRACT

A flexible keyboard cover film and a control process of the flexible keyboard cover film are provided. The flexible keyboard cover film allows a user to perform a touch function and is suitable for covering a keyboard of a computer, and the flexible keyboard cover film includes a flexible transparent base material, a touch device, and an input/output (I/O) interface. The flexible transparent base material covers the keyboard. The touch device is located on the flexible transparent base material and is electrically connected to the computer through the I/O interface.

9 Claims, 6 Drawing Sheets

FLEXIBLE KEYBOARD COVER FILM

CROSS-REFERENCE TO RELATED APPLICATION

This application claims the priority benefit of Chinese application serial no. 201510085483.4, filed on Feb. 17, 2015. The entirety of the above-mentioned patent application is hereby incorporated by reference herein and made a part of this specification.

FIELD OF THE INVENTION

The invention relates to a keyboard cover film. More particularly, the invention relates to a flexible keyboard cover film suitable for covering a keyboard and a control process of the flexible keyboard cover film.

DESCRIPTION OF RELATED ART

With rapid development and extensive applications of information technologies, wireless mobile communications, and information home appliances in recent years, touch panels have been introduced as user interfaces of many information products in replacement of conventional user interfaces, such as keyboards and mice. Common touch panels are roughly classified into capacitive touch panels and resistant touch panels, and the capacitive touch panels characterized by multi-touch have drawn great attention.

For instance, the user interface of a notebook computer includes a keyboard and a touch pad module located below the keyboard; in order for users to input information, the keyboard of the notebook computer is required to occupy certain area, which may otherwise limit the area occupied by the touch pad module. In general, the touch panel module is often complained by the users because of its insufficient touch area and the inconvenience caused thereby, and thus most users tend to use the mouse to rapidly control the cursor. In addition to the touch pad module, a touch screen of the notebook computer may also be applied to rapidly control the cursor. The touch area of the touch screen is greater than that of the touch pad module; however, the users are required to reach the touch screen by hand during operation and thus are likely to experience fatigue if the users keep on touching the touch screen for a long period of time. Moreover, the manufacturing costs of the touch screen are greater than those of the touch pad module; accordingly, how to ensure the sufficient touch area and the users' comfort without increasing the manufacturing costs is one of the research topics in the pertinent field.

SUMMARY OF THE INVENTION

The invention is directed to a flexible keyboard cover film and a control process thereof. The flexible keyboard cover film is suitable for covering a keyboard of a computer and allows a user to perform a touch function, such that the user is capable of performing actions within a relatively large touch area.

In an embodiment of the invention, a flexible keyboard cover film that allows a user to perform a touch function and is suitable for covering a keyboard of a computer is provided. The flexible keyboard cover film includes a flexible transparent base material, a touch device, and an input/output (I/O) interface. The flexible transparent base material is used for covering the keyboard, the touch device is located on the flexible transparent base material, and the touch device is electrically connected to the computer through the I/O interface.

According to an embodiment of the invention, a material of the flexible transparent base material includes silicone, polyimide resin, or a multi-layered polymer composite material.

According to an embodiment of the invention, a thickness of the flexible transparent base material is within a range from about 1 mm to about 8 mm.

According to an embodiment of the invention, the flexible transparent base material has a first surface and a second surface opposite to the first surface, the touch device is located on the first surface, and the second surface is in contact with the keyboard.

According to an embodiment of the invention, the flexible transparent base material has a first surface and a second surface opposite to the first surface, the first surface is a flat surface, the touch device is located on the first surface, and the flexible transparent base material has a plurality of cavities located on the second surface.

According to an embodiment of the invention, the flexible transparent base material has a first surface and a second surface opposite to the first surface, the first surface is a flat surface, the touch device is located on the first surface, and the flexible transparent base material has a plurality of protrusions located on the second surface.

According to an embodiment of the invention, the flexible transparent base material and the touch device are capable of being bent or rolled 180 degrees or 360 degrees.

According to an embodiment of the invention, the I/O interface includes a cable I/O interface or a wireless I/O interface.

According to an embodiment of the invention, the touch device includes a flexible substrate and a sensing electrode layer.

According to an embodiment of the invention, the sensing electrode layer is located on the flexible substrate and between the flexible substrate and the flexible transparent base material.

According to an embodiment of the invention, the flexible keyboard cover film further includes an adhesive arranged between the touch device and the flexible transparent base material.

According to an embodiment of the invention, the I/O interface includes a universal serial bus (USB) interface or a wireless transceiver module.

According to an embodiment of the invention, a transmittance of the flexible transparent base material and a transmittance of the touch device are respectively within a range from 80% to 100%.

According to an embodiment of the invention, the flexible keyboard cover film further includes an adhesive arranged between the flexible transparent base material and the sensing electrode layer, and the sensing electrode layer is located on the flexible transparent base material.

In an embodiment of the invention, a control process of a flexible keyboard cover film is provided, and the control process includes following steps. Whether the flexible keyboard cover film is connected to a computer is determined. If no flexible keyboard cover film is detected to be connected to the computer, an input signal from a keyboard acting as a user input interface is processed. If the flexible keyboard cover film is detected to be connected to the computer, whether an input signal from the flexible keyboard cover film and the input signal from the keyboard are both received is further determined. If the input signal from the flexible keyboard cover film and the input signal from the keyboard are not both received, the computer merely processes the input signal from the flexible keyboard cover film; if the input signal from the flexible keyboard cover film and the input signal from the keyboard are both received, the computer ignores the input signal from the flexible keyboard cover film and processes the input signal from the keyboard. Alternatively, the computer ignores the input signal from the keyboard and processes the input signal from the flexible keyboard cover film.

According to an embodiment of the invention, when the computer detects both the input signal from the flexible keyboard cover film and the input signal from the keyboard, and a continuously detected frequency of the input signal from the keyboard is higher than a predetermined frequency, the control process includes determining a user is using the keyboard and ignoring the input signal from the flexible keyboard cover film.

According to an embodiment of the invention, if the computer detects both the input signal from the flexible keyboard cover film and the input signal from the keyboard, and if no sliding action performed by a user on the flexible keyboard cover film is detected, the control process includes determining the user is using the keyboard and ignoring the input signal from the flexible keyboard cover film.

According to an embodiment of the invention, if the computer detects both the input signal from the flexible keyboard cover film and the input signal from the keyboard, and if a sliding action performed by a user on the flexible keyboard cover film is detected, the control process includes determining the user is performing the action on the flexible keyboard cover film and ignoring the input signal from the keyboard.

According to an embodiment of the invention, when the computer detects both the input signal from the flexible keyboard cover film and the input signal from the keyboard, and a continuously detected frequency of the input signal from the keyboard is lower than a predetermined frequency, the control process includes determining a user is performing an action on the flexible keyboard cover film and ignoring the input signal from the keyboard.

In view of the above, the flexible keyboard cover film provided herein sufficiently takes advantage of the area occupied by the keyboard and thus allows the user to perform actions within a relatively large touch area, thereby bringing convenience and comfort to the user.

To make the above features and advantages of the present invention more comprehensible, several embodiments accompanied with drawings are described in detail as follows.

DETAILED DESCRIPTIONS OF EMBODIMENTS

Figure 1:
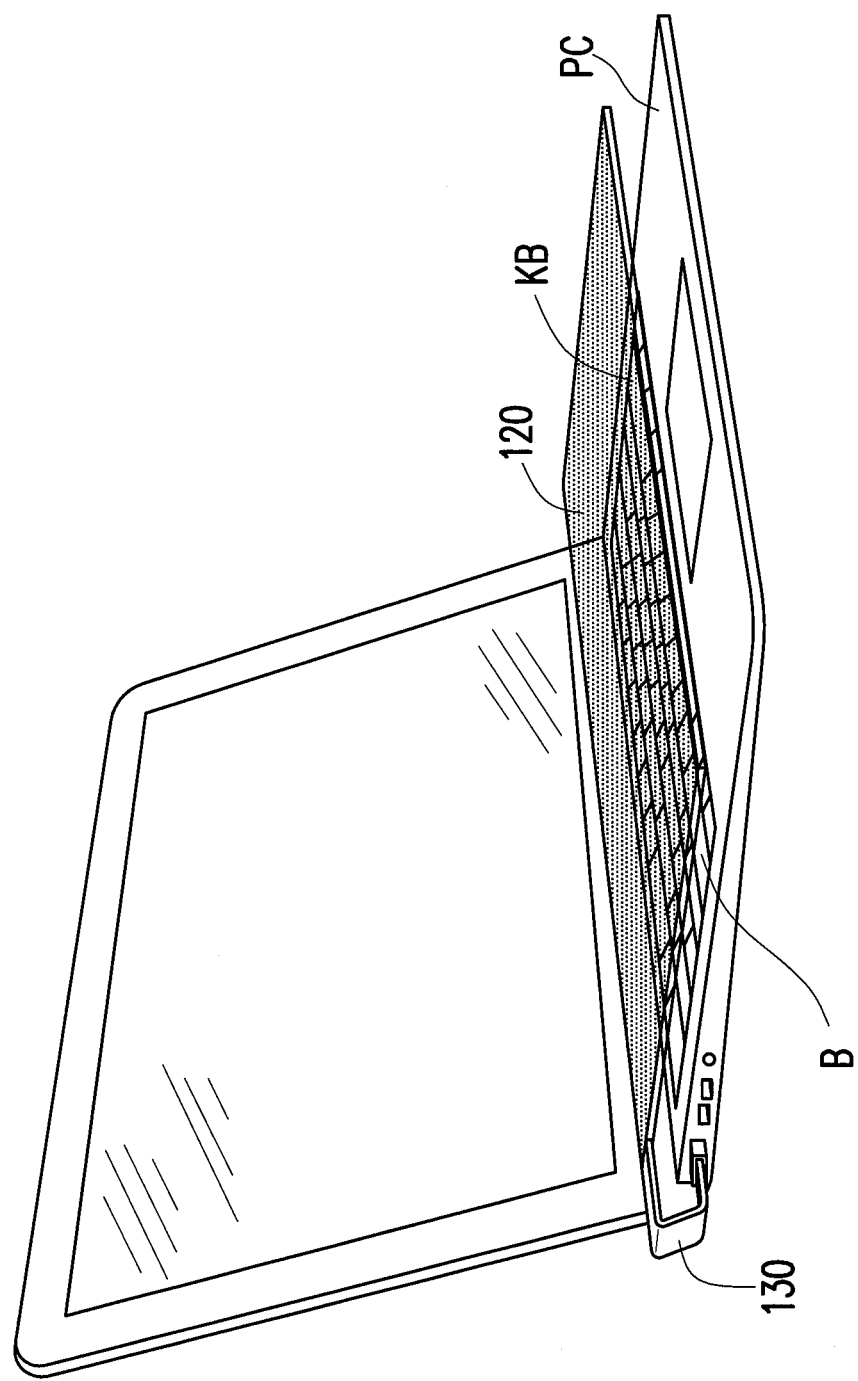
FIG. 1 is a schematic view illustrating a flexible keyboard cover film that covers a keyboard of a computer according to an embodiment of the invention.
Figure 2A:
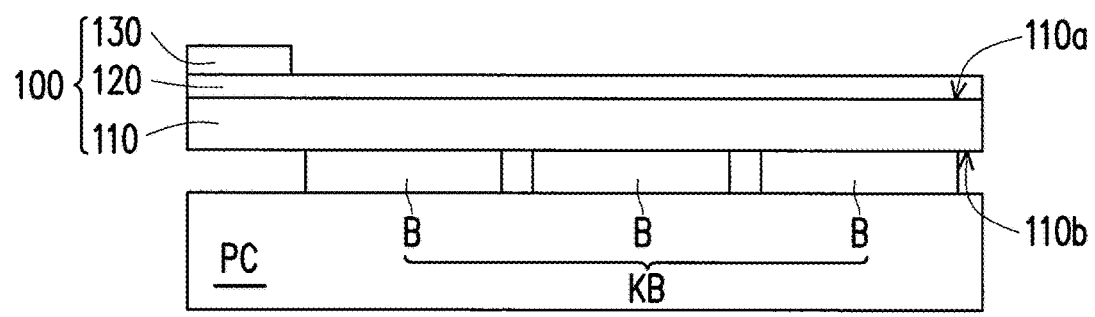
FIG. 2A, FIG. 2B, and FIG. 2C are schematic views illustrating different types of flexible keyboard cover films which cover a keyboard of a computer according to an embodiment of the invention.
Figure 2B:
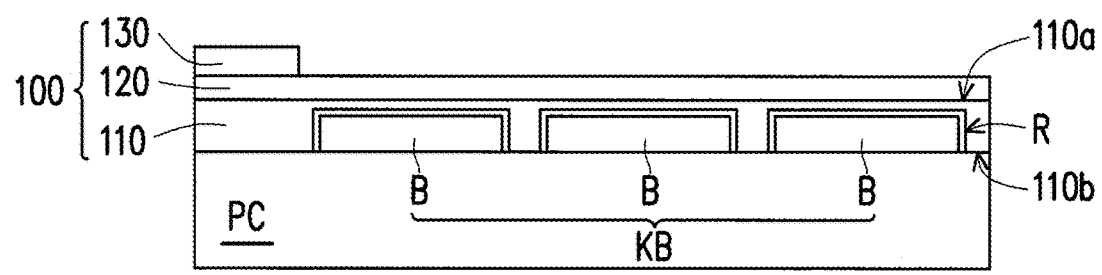
Figure 2C:
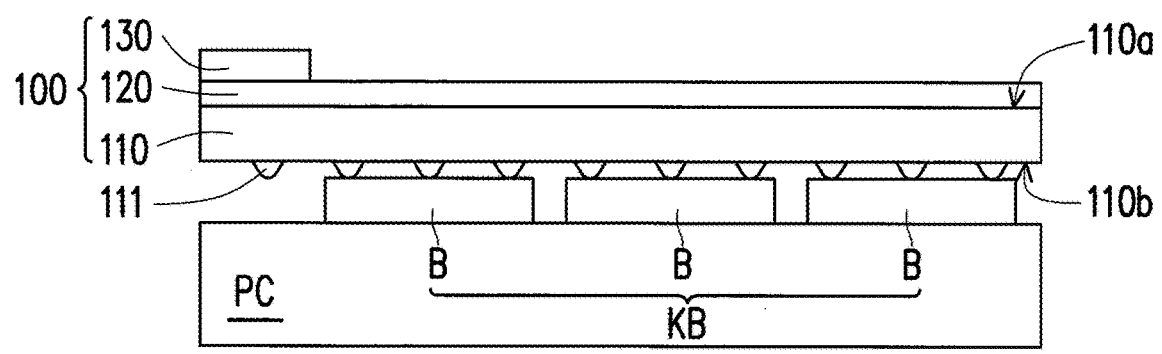

FIG. 1 is a schematic view illustrating a flexible keyboard cover film that covers a keyboard of a computer according to an embodiment of the invention. FIG. 2A, FIG. 2B, and FIG. 2C are schematic views illustrating different types of flexible keyboard cover films which cover a keyboard of a computer according to an embodiment of the invention. With reference to FIG. 1, FIG. 2A, FIG. 2B, and FIG. 2C, a flexible keyboard cover film 100 provided in the present embodiment is suitable for covering a keyboard KB of a computer PC. In the present embodiment, the computer PC is a notebook computer, for instance. Besides, the keyboard KB of the computer PC is arranged within a rectangular area or an irregular area, and the keyboard KB includes a plurality of keys B arranged in a specific manner. The flexible keyboard cover film 100 may be shaped in a similar manner to the keyboard KB, i.e., the flexible keyboard cover film 100 may have a rectangular shape or an irregular shape.

As shown in FIG. 1, FIG. 2A, and FIG. 2B, the flexible keyboard cover film 100 provided in the present embodiment includes a flexible transparent base material 110, a touch device 120, and an input/output (I/O) interface 130. The flexible transparent base material 110 covers the keyboard KB, the touch device 120 is located on the flexible transparent base material 110, and the touch device 120 is electrically connected to the computer PC through the I/O interface 130. It can be learned from FIG. 2A, FIG. 2B, and FIG. 2C that the flexible transparent base material 110 has a first surface 110a and a second surface 110b opposite to the first surface 110a, the touch device 120 is located on the first surface 110a of the flexible transparent base material 110, and the keyboard KB is in contact with the second surface 110b of the flexible transparent base material 110. In brief, if the flexible keyboard cover film 100 is arranged on the keyboard KB, the flexible transparent base material 110 is located between the touch device 120 and the keyboard KB. According to the present embodiment, in order for a user to perform an input action through the keyboard KB, the flexible transparent base material need be characterized by flexibility to some extent, such that the user is able to exert an adequate force to push the keys B of the keyboard KB; preferably, the flexible transparent base material 110 and the touch device 120 are capable of being bent or rolled 180 degrees or 360 degrees. Besides, in order for the user to clearly observe symbols on the keys B of the keyboard KB when he or she intends to perform the input function through the keyboard KB, the flexible keyboard cover film 100 need be characterized by transparency. For instance, both the flexible transparent base material 110 and the touch device 120 should be pervious to light to some extent. In a preferred embodiment, a (light) transmittance of the flexible keyboard cover film 100 is required to be within a range from 80% to 100%, for instance. Besides, the flexible transparent base material 110 need have supporting strength to some extent, so as to prevent a user from accidentally pressing the keys B of the keyboard KB while performing certain actions through the flexible keyboard cover film 100. Note that the touch device 120 on the flexible transparent base material 110 is also touched while the user presses the keys B of the keyboard KB through exerting an adequate force; at this time, a touch signal generated by the touch device 120 and an input signal generated by the keyboard KB may be interfered with each other. To prevent said signal interference, the present embodiment may be implemented through controlling hardware, software, or firmware. According to the present embodiment, a material of the flexible transparent base material 110 may be silicone, polyimide resin, or a multi-layered polymer composite material. In an embodiment of the invention, a thickness of the flexible transparent base material 110 may be within a range from about 1 mm to about 8 mm. In addition, an area occupied by the flexible transparent base material 110 is greater than or equal to an area occupied by the keyboard KB, so as to protect the keyboard KB and further prevent dust and moisture from entering the keyboard KB.

As shown in FIG. 2A, the flexible transparent base material 110 has a flat second surface 110b, and the keys B are in contact with the second surface 110b. As shown in FIG. 2B, the flexible transparent base material 110 provided in the present embodiment may alternatively have a plurality of cavities R located on the second surface 110b, and each of the keys B is located in one of the cavities R. That is, the shape and the dimension of the cavities R arranged on the second surface 110b correspond to those of the keys B of the keyboard KB. In addition, a depth of each cavity R is similar to and is slightly greater than a height of each key B. Due to the design of the cavities R, the flexible transparent base material 110 can securely cover the keyboard KB. In other words, the design of the cavities R effectively prevents the relative sliding action between the flexible transparent base material 110 and the keyboard KB.

In another feasible embodiment, the flexible transparent base material 110 may have the design shown in FIG. 2C. Specifically, as shown in FIG. 2C, the flexible transparent base material 110 has a plurality of regularly arranged or randomly arranged flexible protrusions 111. Here, the flexible protrusions 111 are distributed on the second surface 110b of the flexible transparent base material 110 and are used to be in contact with the keyboard KB. The flexible protrusions 111 are able to enhance the contact friction between the flexible transparent base material 110 and individual keys B, prevent the sliding movement of the flexible keyboard cover film 100, and further allow the flexible keyboard cover film 100 to securely cover the keyboard KB.

The touch device 120 is, for instance, a capacitive touch device or a resistive touch device. In a feasible embodiment, the touch device 120 is a touch-sensing film formed in advance, and the touch-sensing film can be adhered to the first surface 110a of the flexible transparent base material 110 via an appropriate adhesive.

Figure 3A:
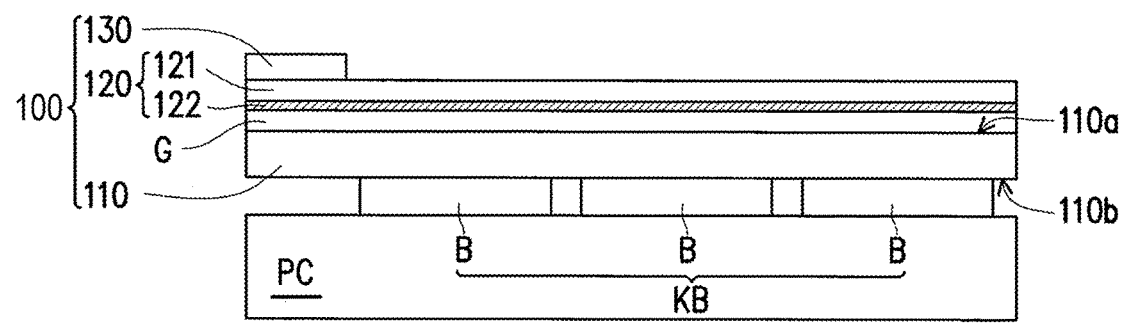
FIG. 3A and FIG. 3B are schematic views illustrating flexible keyboard cover films which have different types of touch devices and cover a keyboard of a computer according to an embodiment of the invention.
Figure 3B:
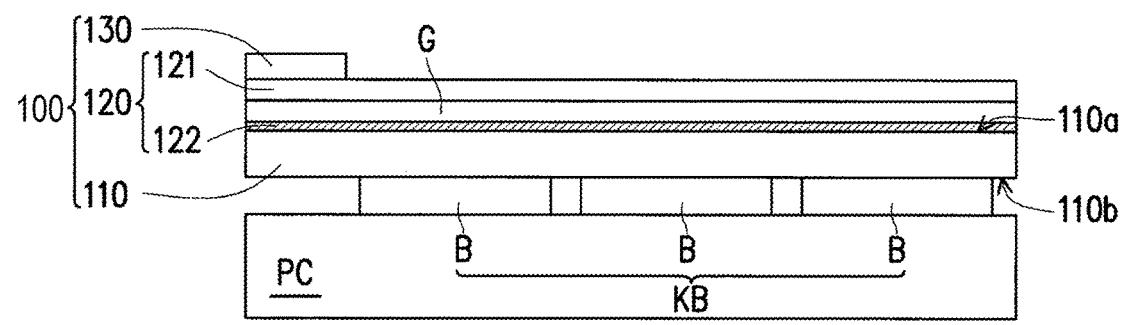

FIG. 3A and FIG. 3B are schematic views illustrating flexible keyboard cover films which have different types of touch devices and cover a keyboard of a computer according to an embodiment of the invention. With reference to FIG. 3A, the touch device 120 provided herein includes a flexible substrate 121 and a sensing electrode layer 122, and the sensing electrode layer 122 is formed on the flexible substrate 121 through performing film deposition and film patterning processes (e.g., photolithography and etching processes), for instance. The touch device 120 is then adhered to the flexible transparent base material 110 through an adhesive G. After the touch device 120 is adhered to the flexible transparent base material 110, the sensing electrode layer 122 is located between the flexible substrate 121 and the flexible transparent base material 110. Here, the flexible substrate 121 is required to be pervious to light to some extent, and the transmittance of the flexible substrate 121 may be the same as or similar to that of the flexible transparent base material 110.

With reference to FIG. 3B, in another feasible embodiment, the touch device 120 includes a flexible substrate 121 and a sensing electrode layer 122, and the sensing electrode layer 122 is formed on the first surface 110a of the flexible transparent base material 110 through performing film deposition and film patterning processes (e.g., photolithography and etching processes), for instance. The flexible substrate (i.e., a cover plate) 121 then covers the sensing electrode layer 122, and the flexible 121 and the flexible transparent base material 110 are then adhered to each other through the adhesive G.

Figure 4:
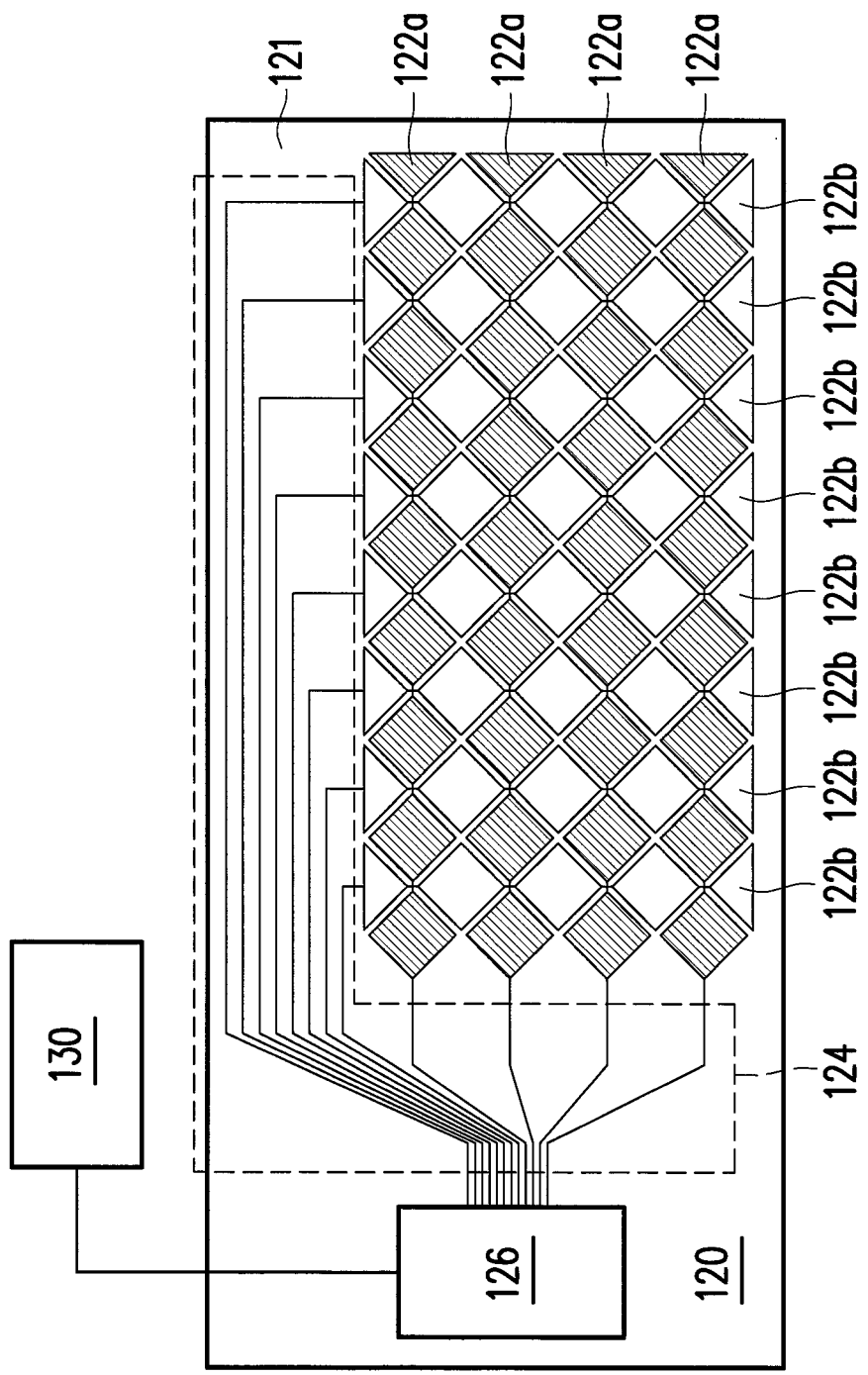
FIG. 4 is a schematic view illustrating a sensing electrode layer of a touch device according to an embodiment of the invention.

FIG. 4 is a schematic view illustrating a sensing electrode layer of a touch device according to an embodiment of the invention. With reference to FIG. 4, the touch device 120 provided herein includes a plurality of sensing electrodes 122a and 122b which are alternately arranged, a plurality of fan-out wirings 124 connected to the sensing electrodes 122a and 122b, and a driver unit 126, for instance. Each of the sensing electrodes 122a and 122b is electrically connected to the driver unit 126 through one of the corresponding fan-out wirings 124. The touch device 126 is, for instance, a touch sensing chip that receives and processes the touch signals sensed by the sensing electrodes 122a and 122b. Besides, the driver unit 126 is further electrically connected to the I/O interface 130, such that the touch signal generated by the touch device 120 can be transmitted to the computer PC through the I/O interface 130. According to an embodiment of the invention, the I/O interface 130 includes a universal serial bus (USB) interface or a wireless transceiver module.

It can be learned from FIG. 1 that the communication between the touch device 120 and the computer PC is accomplished through the cable I/O interface 130. Here, the cable I/O interface 130 includes a USB interface, a PS/2 interface, an RS232 interface, and so forth. However, the type of the I/O interface 130 is not limited herein. For instance, the communication between the touch device 120 and the computer PC may also be accomplished through the wireless I/O interface 130. Here, the wireless I/O interface 130 includes a Bluetooth wireless I/O interface, an IR wireless I/O interface, an RF wireless I/O interface, and so forth.

To prevent the interference between the touch signal generated by the touch device 120 and the input signal generated by the keyboard KB, the present embodiment can be implemented though hardware switch or software control. Detailed descriptions of the control process of the flexible keyboard cover film 100 are provided hereinafter with reference to FIG. 5.

Figure 5:
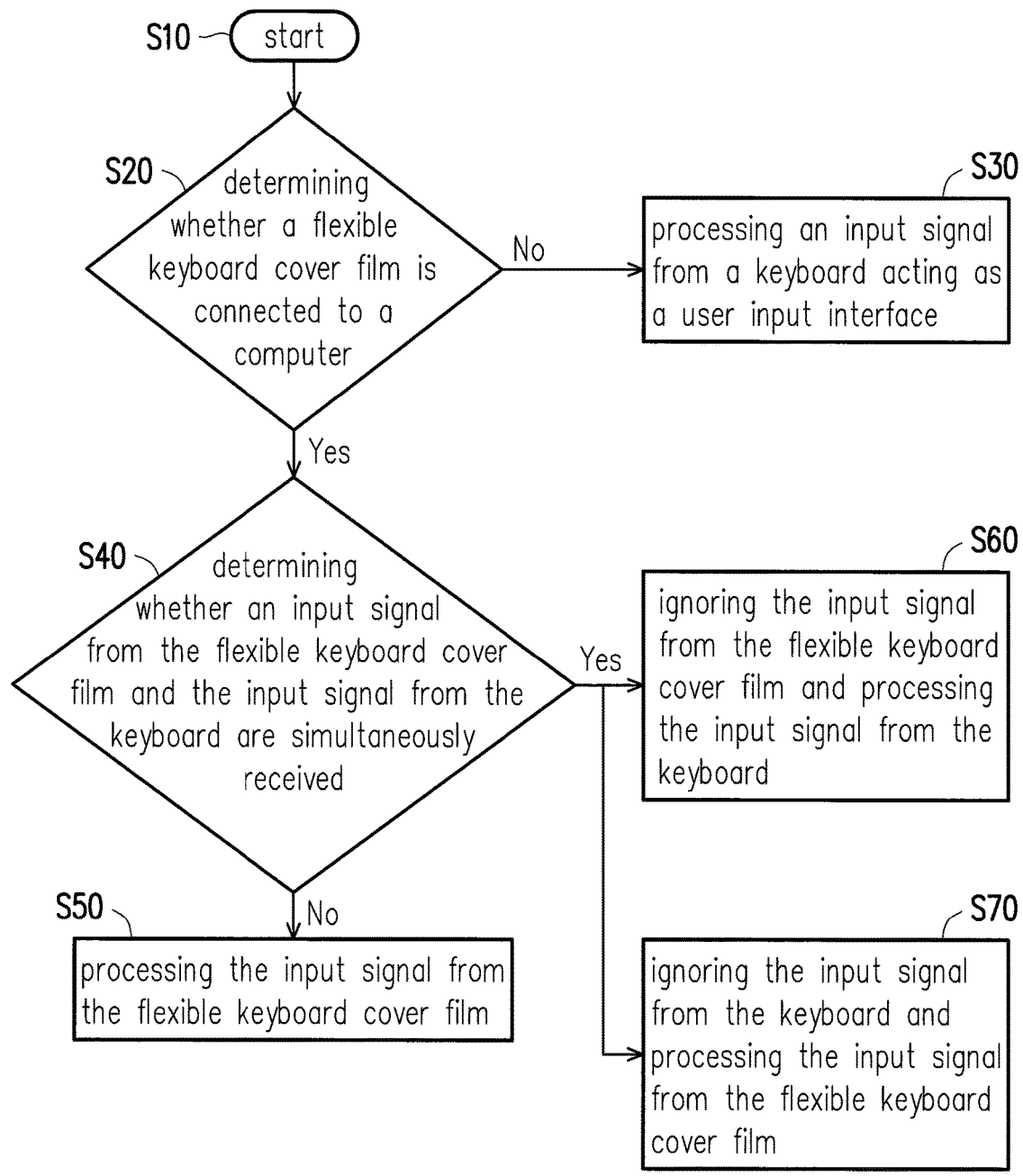
FIG. 5 is a flowchart of a control process of a flexible keyboard cover film after the flexible keyboard cover film is connected to a computer.

FIG. 5 is a flowchart of a control process of a flexible keyboard cover film after the flexible keyboard cover film is connected to a computer. As shown in FIG. 5, in step S10 and step S20, it is determined whether a flexible keyboard cover film is connected to a computer. If no flexible keyboard cover film is detected to be connected to the computer, in step S30, an input signal from a keyboard acting as a user input interface is processed; on the contrary, if the flexible keyboard cover film is detected to be connected to the computer, in step S40, it is further determined whether an input signal from the flexible keyboard cover film and the input signal from the keyboard are both received.

As to the determination in step S40, if the input signal from the flexible keyboard cover film and the input signal from the keyboard are not both received (i.e. only the input signal from the flexible keyboard cover film is received), the computer merely processes the input signal from the flexible keyboard cover film (step S50). By contrast, if the input signal from the flexible keyboard cover film and the input signal from the keyboard are both received, at least two steps may be performed (step S60 and step S70) in response to two of the following conditions. On the first condition, if the user intends to input a signal to the computer through the keyboard, and if the user inadvertently touches the flexible keyboard cover film in process of inputting the signal, the computer ignores the input signal from the flexible keyboard cover film and processes the input signal from the keyboard (step S60). In step S60, the determination rules are exemplified below. If the computer detects both the input signal from the flexible keyboard cover film and the input signal from the keyboard, and a continuously detected frequency of the input signal from the keyboard is higher than a predetermined frequency (e.g. two or more input signals from the keyboard are detected within a certain time period, such as within a time period of 5~10 seconds), the control process includes determining a user is using the keyboard and ignoring the input signal from the flexible keyboard cover film. Alternatively, if the computer detects both the input signal from the flexible keyboard cover film and the input signal from the keyboard, and if no sliding action performed by a user on the flexible keyboard cover film is detected (or the sliding movement does not exceed a certain distance, such as a distance of 0.5~1 cm), the control process includes determining the user is using the keyboard and ignoring the input signal from the flexible keyboard cover film. On the second condition, if the user intends to input a signal to the computer through the flexible keyboard cover film, and if the user inadvertently touches the flexible keyboard cover film in process of inputting the signal, the computer ignores the input signal from the keyboard and processes the input signal from the flexible keyboard cover film (step S70). In step S70, the determination rules are exemplified below. If the computer detects both the input signal from the flexible keyboard cover film and the input signal from the keyboard, and if a sliding action performed by a user on the flexible keyboard cover film is detected (or the sliding movement exceeds 0.5 cm), the control process includes determining the user is performing the action on the flexible keyboard cover film and ignoring the input signal from the keyboard. Alternatively, if the computer detects both the input signal from the flexible keyboard cover film and the input signal from the keyboard, and a continuously detected frequency of the input signal from the keyboard is lower than a predetermined frequency, the control process includes determining a user is performing an action on the flexible keyboard cover film and ignoring the input signal from the keyboard.

In light of the foregoing, to prevent the computer from not being able to determine the input interface adopted by the user, the computer or the flexible keyboard cover film may inquire or remind the user through the control of hardware (e.g., physical switching keys formed on the flexible keyboard cover film capable of emitting light to inquire or remind the user), software (e.g., virtual switching keys displayed on a computer screen), or firmware. Thereby, the user may assign one of the hardware, software, and firmware as the input interface during the process of inputting information. Additionally, if the computer is unable to make sure whether the user intends to switch to the keyboard mode or the flexible keyboard cover film mode, the computer may inquire or remind the user through the control of software (e.g., virtual switching keys displayed on the computer screen) or firmware. It is also likely to display options for the user to select the desired mode.

To sum up, the flexible keyboard cover film provided herein sufficiently takes advantage of the area occupied by the keyboard and thus allows the user to perform actions within a relatively large touch area, thereby bringing convenience and comfort to the user. Moreover, the flexible keyboard cover film provided herein is capable of protecting the keyboard and preventing dust from entering the keyboard.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A flexible keyboard cover film allowing a user to perform a touch function, the flexible keyboard cover film being suitable for covering a physical keyboard of a computer and comprising:

a flexible transparent base material used for covering the physical keyboard, wherein the physical keyboard comprises a plurality of keys allowing the user to push to be able to directly perform an input action independently of the flexible keyboard cover film, the flexible transparent base material has a first surface and a second surface opposite to the first surface, the second surface is configured to be in contact with the keys of the physical keyboard, the flexible transparent base material is capable of being moved in relation to the physical keyboard, the flexible transparent base material is not adhered to the physical keyboard, and the flexible transparent base material comprises silicone, polyimide resin or a multi-layered polymer composite material;

a touch device located on the flexible transparent base material, the touch device comprising a sensing electrode layer, a flexible substrate and a driver unit, wherein the sensing electrode layer of the touch device is located on the first surface of the flexible transparent base material, and the sensing electrode layer is located between the flexible substrate and the flexible transparent base material, and wherein the sensing electrode layer comprises a plurality of first sensing electrodes and a plurality of second sensing electrodes, the first sensing electrodes cross the second sensing electrodes, and the first sensing electrodes and the second sensing electrodes are in direct physical contact with a same surface of the flexible substrate; and an input/output interface for connecting the computer, wherein the sensing electrode layer of the touch device is electrically connected to the input/output interface through the driver unit, the touch device is pervious to light, the driver unit is electrically connected between the input/output interface and the first sensing electrodes and between the input/output interface and the second sensing electrodes, the input/output interface comprises a universal serial bus (USB) interface, a PS/2 interface, or an RS232 interface, the input/output interface has two ends, one of the ends of the input/output interface is in physical contact with an edge of the touch device, the input/output interface is protruded from the edge of the touch device, the other one of the ends of the input/output interface is outside the touch device and at a distance from the edge of the touch device, and the input/output interface is capable of being physically separated and electrically disconnected from the computer through the other one of the ends of the input/output interface.

2. The flexible keyboard cover film of claim 1, wherein a thickness of the flexible transparent base material is within a range from about 1 mm to about 8 mm.

3. The flexible keyboard cover film of claim 1, wherein the touch device is located on the first surface, and the second surface is configured to be in contact with the physical keyboard.

4. The flexible keyboard cover film of claim 1, wherein the first surface is a flat surface, and the flexible transparent base material has a plurality of cavities located on the second surface.

5. The flexible keyboard cover film of claim 1, wherein the first surface is a flat surface, and the flexible transparent base material has a plurality of protrusions located on the second surface.

6. The flexible keyboard cover film of claim 1, wherein the flexible transparent base material and the touch device are capable of being bent or rolled 180 degrees or 360 degrees.

7. The flexible keyboard cover film of claim 1, wherein the sensing electrode layer is located on the flexible substrate.

8. The flexible keyboard cover film of claim 1, further comprising an adhesive arranged between the touch device and the flexible transparent base material.

9. The flexible keyboard cover film of claim 1, wherein a transmittance of the flexible transparent base material and a transmittance of the touch device are respectively within a range from 80% to 100%.

\* \* \* \* \*